(12) United States Patent
Scott-Thomas et al.

(10) Patent No.: US 6,489,798 B1
(45) Date of Patent: Dec. 3, 2002

(54) METHOD AND APPARATUS FOR TESTING IMAGE SENSING CIRCUIT ARRAYS

(75) Inventors: John Scott-Thomas; Ron McDonald, both of Ottawa; Tom Little, Woodlawn; George Chamberlain, Kanata, all of (CA)

(73) Assignee: Symagery Microsystems Inc., Ontario (CA)

(*) Notice: Subject to any disclaimer, the term of this patent is extended or adjusted under 35 U.S.C. 154(b) by 0 days.

(21) Appl. No.: 09/538,905

(22) Filed: Mar. 30, 2000

(51) Int. Cl.⁷ ............................................... G01R 31/26
(52) U.S. Cl. ........................ 324/765; 324/766; 324/767
(58) Field of Search ................................. 324/765, 770, 324/766, 767; 250/208.1; 348/308

(56) References Cited

U.S. PATENT DOCUMENTS

| | | | | |
|---|---|---|---|---|
| 5,153,421 A | * | 10/1992 | Tandon et al. | 250/208.1 |
| 5,276,400 A | | 1/1994 | Denyer et al. | 324/158 |
| 5,451,768 A | | 9/1995 | Hosier et al. | 250/214 |
| 5,654,537 A | | 8/1997 | Prater | 250/208.1 |
| 5,721,422 A | * | 2/1998 | Bird | 250/208.1 |
| 5,896,173 A | * | 4/1999 | Hassler | 348/162 |
| 5,898,168 A | * | 4/1999 | Gowda et al. | 250/208.1 |
| 6,028,299 A | * | 2/2000 | Hirama et al. | 250/208.1 |

* cited by examiner

*Primary Examiner*—Michael Sherry
*Assistant Examiner*—Paresh Patel
(74) *Attorney, Agent, or Firm*—Hayes Soloway PC

(57) ABSTRACT

A method and apparatus for testing an image sensor array such as a C-MOS imager which has sensing circuits arranged in rows and columns and wherein the sensing circuits include photosensitive devices is described. A reset voltage is applied to the photosensitive device in each of the sensor circuits such that at least adjacent circuits are reset to different voltage levels. The voltage on each photosensitive device is detected and compared to an expected level to determine if and where any faults may exist in the sensing circuits or lines in the array. A different reset voltage may be applied to each of the sensor circuits, however in one embodiment, a supply with only two voltage levels may be used. One voltage level is applied to every second column to provide a supply voltage to the photosensitive devices and to every second row to generate a reset enable signal for the photosensitive devices. The second voltage level is applied to the remaining columns and rows resulting in different reset voltage levels on adjacent sensing circuits.

18 Claims, 5 Drawing Sheets

METHOD AND APPARATUS FOR TESTING IMAGE SENSING CIRCUIT ARRAYS

FIELD OF THE INVENTION

The invention relates generally to image sensing circuits arrays, and more particularly to the method and apparatus for testing the arrays.

BACKGROUND OF THE INVENTION

A conventional sensing array is composed of individual light sensitive circuits called pixels that are organized in rows and columns. A row of pixels has a common line connecting the control gates of their respective access transistors. Data is passed from a pixel through its access transistor to a data line. Each column of pixels is connected to a common data line. During the manufacture of a sensor array, open or short circuits may occur between adjacent row lines or adjacent data lines due to the presence of dust or other particulate matter. Open or short circuiting of row lines or data lines may also occur due to improper control of the etching process.

CMOS image sensor arrays can employ several types of pixels. Passive pixel sensor circuits are comprised of a simple photodiode and an access transistor. Active pixel sensor (APS) circuits have added features including a reset transistor and a source follower amplifier. Individual sensor circuits may suffer from similar problems as the row lines and data lines, in that they may be either short circuited or open circuited and therefore do not perform their proper function. In order to overcome these problems, defects in the sensor array must be detected in order to select arrays that are acceptable for use.

Integrated image sensors have traditionally been relatively expensive devices, many of which used a technology known as charge coupled device (CCD). The nature of these devices did not permit the use of extensive integrated test features, therefore testing was primarily dependent on the use of external light sources. This traditional test method continued for the testing of CMOS image sensors such as those using APS circuits. Therefore, testing of integrated imager active pixel sensor arrays has required the use of expensive, calibrated light sources to perform optical testing of the sensors. Typically, during production testing, an image sensor would be exposed to light of varying intensity ranging from black to white. Measurements would be taken to determine the response of the array. The length of time required to perform these optical tests can be excessive, adding dramatically to the cost of the device. Reduction of test times and therefore costs can be accomplished by reducing the dependency of these tests on a calibrated light source.

In addition to the time required to test an integrated imager array using a calibrated light source, the accuracy of the test is also a concern. If two neighboring pixels were shorted together during the manufacturing process, the measured output would be the same as if the pixels were not shorted together. This occurs because both pixels have been exposed to the same intensity of light. The defect may go undetected until the device is placed in a system and tested under "real world" conditions. Unfortunately, detection of the defect is dependent on human viewing of the output as displayed on the viewing device (e.g. a cathode ray tube or liquid crystal display panel). As the number of pixels on an integrated circuit expands, it becomes increasingly difficult for a human to detect such faults. Special training is required for the human observers and even then, human interpretation plays a major role in the determination of acceptable products. However, humans lack consistent observational skills due to their very nature and varying levels of alertness throughout the day. Therefore, this type of testing is not acceptable for high volume, cost sensitive sensor products.

Other testing methods have been proposed. U.S. Pat. No. 5,276,400 which issued to Denyer et al on Jan. 4, 1994 discloses a test arrangement which does not require the irradiation of the array by a light source. Test circuitry is integrated at the periphery of the sensor array which attempts to drive digital test patterns on the row access lines and data lines. The resulting signal patterns can then be compared to expected values to determine the presence of production faults. This is a much faster test method than those mentioned previously. However, the arrangement proposed by Denyer et al has two major shortcomings. It is suited for passive pixel arrays but not for arrays of active pixel sensors. In an active pixel array, it would only allow for the testing of row line and data line integrity and not for the testing of the individual pixel structures. In addition, digital test patterns are used and these will not necessarily provide accurate results since during actual operation, the voltages obtained on the data lines are analog signals due to the nature of the sensor array.

Another test system is disclosed by U.S. Pat. No. 5,451,768 which issued to Hosier et al on Sep. 19, 1995. This system involves test circuitry integrated on the same die as the sensor array for testing a specific pixel and transfer circuit arrangement. This arrangement involves a circuit for injecting a certain amount of charge into the transfer circuit and a smaller amount of charge to bias the photodiode. The difference between these two charges is indicative of the linear response of the pixel. The test circuit places a known amount of bias charge into the pixel. The pixel is not illuminated during testing, so this bias charge should be shifted out through the transfer circuit. This allows testing for the presence of the correct bias charge and for the proper photodiode response linearity. However, this system does not account for the identification of problems with the row lines or data lines such as short circuits between adjacent lines or open circuits in an individual line.

U.S. Pat. No. 5,654,537 which issued to Prater on Aug. 5, 1997 also proposes a system for testing an image scanner array having pixel sensor circuits arranged in rows and columns. Prater's apparatus includes a reset voltage source having selectable voltage that may vary in amplitude between ground and the supply voltage levels. The photosensitive devices in the pixel sensor circuits are cyclically tested using a different selected voltage for each cycle to reset the photosensitive devices in the pixel sensor circuits. During each cycle, the outputs of the pixel sensor circuits are sensed to determine whether they are functioning properly. By varying the reset voltage between ground and the power supply as disclosed by Prater, the pixel sensor circuits are tested as if they had received different illumination levels without the need for a calibrated light source. However, the system does not differentiate between adjacent pixel sensor circuits. Prater discloses supplying the variable reset voltage to the drain of the reset transistors in the pixel sensor circuits in the rows and columns. If two neighbouring pixels were shorted together, the measured output would be the same as if the pixels were not faulty because both pixels would have been reset to the same voltage.

Therefore, there is a need for a method and apparatus capable of testing individual radiation sensitive circuits in an image sensing array as well the supply and control lines in the array.

SUMMARY OF THE INVENTION

The invention is directed to a method and apparatus for testing an image sensor array having sensor circuits arranged in rows and columns. The method includes resetting the voltage of the photosensitive device in each of the sensor circuits such that adjacent circuits are reset to different voltage levels, and then sensing the voltage on each of the reset photosensitive devices.

In accordance with one aspect of the invention, the voltage resetting step includes applying common reset voltages to sensor circuits in the columns such that adjacent columns receive different reset voltage amplitudes and applying common enable voltage signals to the sensor circuits in the rows such that adjacent rows receive different enable signal amplitudes.

In accordance with another aspect of this invention, the voltage sensing step includes sensing the columns of sensor circuits in parallel and the rows of sensor circuits sequentially.

In accordance with a further aspect of this invention, the sensed voltage from the photosensitive devices is compared to expected values to determine faulty sensor circuits or faulty components in the sensor array.

In accordance with another aspect, the present invention is particularly applicable to an image sensor array having sensor circuits arranged in rows and columns and wherein each sensor circuit includes a photosensitive device, a first switch for applying a reset voltage from a voltage reset line to the photosensitive device under the control of a reset signal, a second switch for sensing the voltage on the photosensitive device under the control of an enable signal and applying it to a data line.

The apparatus for testing an image sensor array having sensing circuits arranged in rows and columns wherein the sensing circuits include photosensitive devices comprises a supply circuit for resetting the voltage of the photosensitive device in each of the sensor circuits such that at least adjacent circuits are reset to different voltage levels and a detector for sensing the voltage on each of the photosensitive devices. The apparatus may further include a circuit for comparing the sensed voltages from the photosensitive devices to expected voltage levels to identify faulty components or sensor circuits in the sensor array.

In accordance with another aspect of this invention, the apparatus may include a first set of conductive lines for providing different reset voltages to adjacent columns of sensing circuits, a second set of conductive lines for providing different voltage reset enable signals to adjacent rows of sensing circuits, a third set of conductive lines for providing access signals to rows of sensing circuits for detecting the reset voltages on the sensing circuits, and a fourth set of lines connected to columns of sensing circuits to receive the detected reset voltages. In addition, the comparator circuit may be connected to the fourth set of lines and compares the detected reset voltages to expected voltage levels to identify faulty components in the sensor array. The apparatus may further include a circuit coupled to each of the second set of conductive lines for generating the voltage reset enable signals, and a first voltage supply may be coupled to each of the voltage reset enable signal generating circuits for supplying different voltages to adjacent enable signal generating circuits.

In accordance with a specific aspect of this invention, a second voltage supply provides a first voltage level $V_1$ to alternate lines in the first set of conductive lines and a second voltage level $V_2$ to the remaining lines in the first set of conductive lines whereas the first voltage supply provides a third voltage level $V_3$ to alternate voltage reset signal generating circuits and a fourth voltage level $V_4$ to the remaining voltage reset signal generating circuits. In addition, $V_1$ may be equal to $V_3$ and $V_2$ may be equal to $V_4$.

These differing voltages may be provided to the testing apparatus from an external source through bond pads on the array die. Alternatively, one or more of the voltages could be generated by a circuit integrated on the same die as the image sensor array.

In accordance with a further aspect of the invention, the comparison circuit may be integrated on the array chip to allow the sensor circuit output values to be compared to the expected values without being sent off chip. This has the advantage of reducing the required complexity of the system used to test the imaging IC.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

Figure 1:
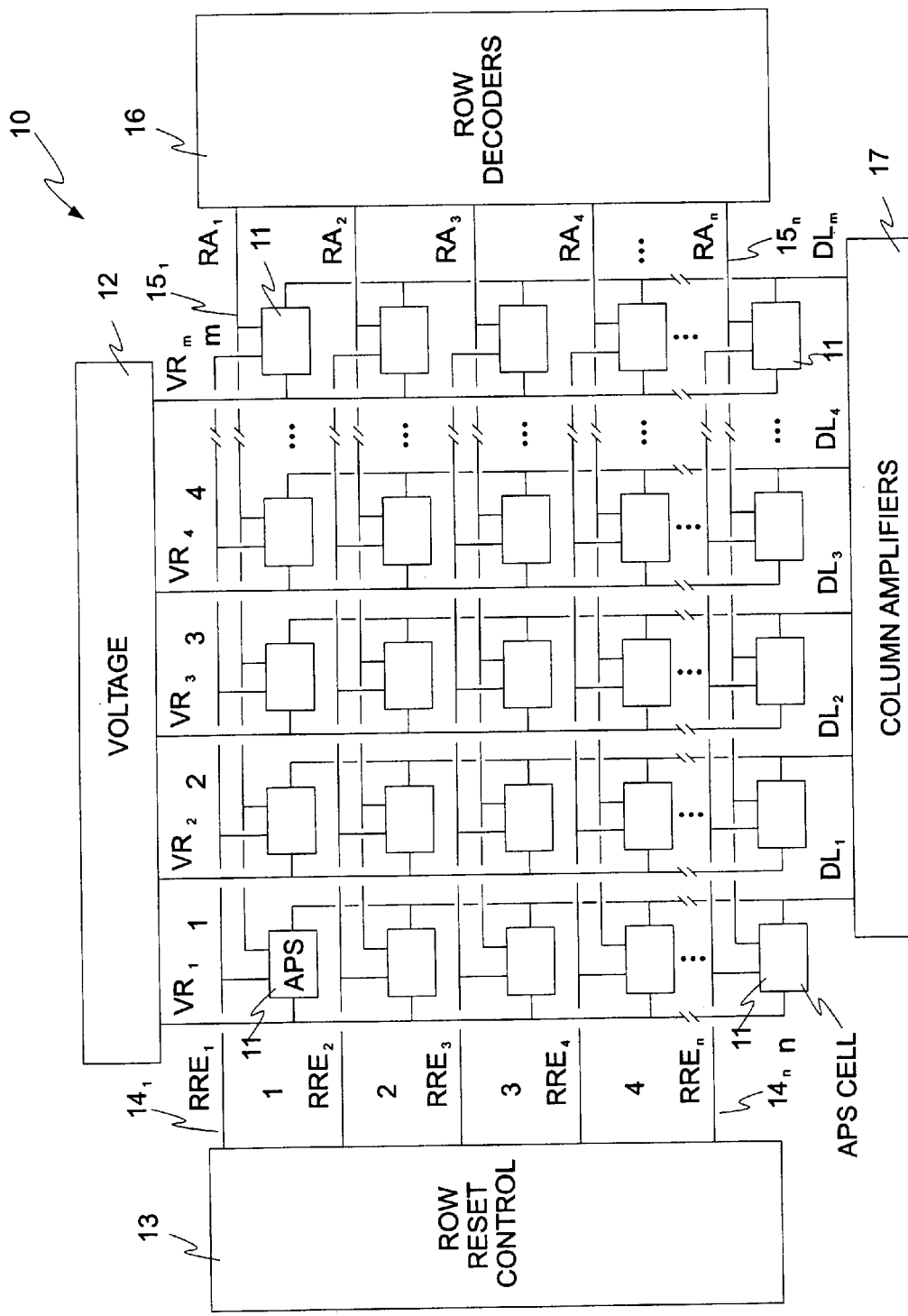
FIG. 1 is a block diagram of a typical image sensor array.

Referring to FIG. 1, there is shown a block diagram of a typical image sensor array 10. The sensor array 10 consists of active pixel sensor (APS) circuits 11 arranged in rows 1 to n and columns 1 to m. The columns 1 to m of APS circuits 11 are provided a voltage Vdd from a voltage supply 12 through lines $VR_1$ to $VR_m$. In addition, each row 1 to n of APS circuits 11 receive reset enable signals $RRE_1$ to $RRE_n$ which are normally pulses of equal amplitude but spaced in time from a row reset control 13 on lines $14_1$ to $14_n$ to reset the sensor circuits 11. Access to each horizontal row 1 to n of APS circuits 11 is provided by applying individual access signals $RA_1$ to $RA_n$ which are normally pulses of equal amplitude but spaced in time via row lines $15_1$ to $15_n$ from a row address decoder 16. The columns 1 to m of APS circuits 11 are connected via data lines $DL_1$ to $DL_m$ which are coupled to column sense amplifiers 17 to amplify the image signal. Thus the rows 1 to n of circuits 11 are sequentially reset by signals $RRE_1$ to $RRE_n$ to detect the incident light on the circuits 11 whereas the sequential sensing of the level of incident light in the rows 1 to n of circuits 11 is initiated by access signals $RA_1$ to $RA_n$ and received on data lines $DL_1$ to $DL_m$.

Figure 2:
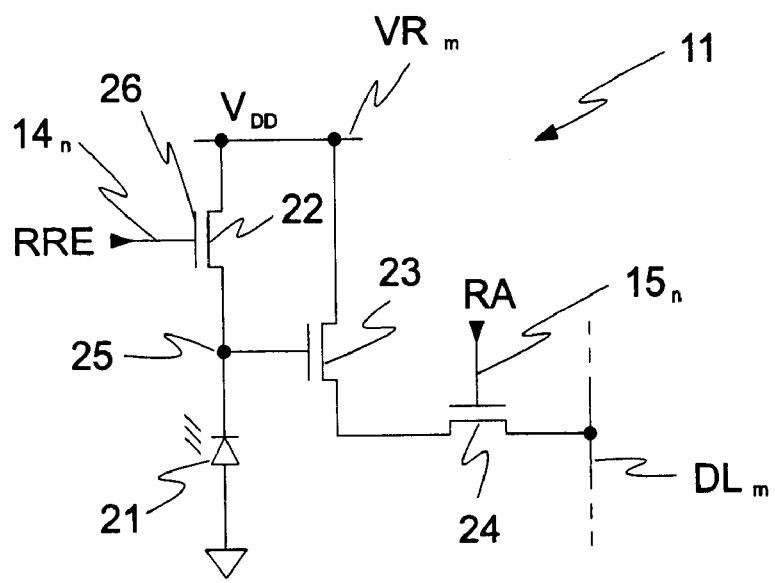
FIG. 2 is a circuit diagram of an active pixel sensor (APS) circuit.

A typical three transistor APS circuit 11 is illustrated in FIG. 2. The circuit 11 consists of a photodiode 21 coupled to the source of a reset transistor 22 and the gate of a transistor 23 which acts as a source follower amplifier. The drains of the reset transistor 22 and the amplifying transistor 23 are normally connected to a supply voltage Vdd through a reset voltage line $VR_m$. The amplifying transistor 23 source is coupled to a data line $DL_m$ through an access transistor 24. When activated, the reset transistor 22 places charge on one node 25 of the photodiode 21 from the supply voltage Vdd. This charge is drained through the photodiode 21 at a rate proportional to the intensity of incident light on the photodiode 21. A signal proportional to this intensity can be read from the circuit 11 on the dataline $DL_m$ by enabling the access transistor 24. The timing for resetting the circuit 11 and then for accessing circuit 11 is controlled by signals $RRE_n$ applied to reset transistors 22 and by signal $RA_n$ applied to transistor 24. The period of time between the two signals will be determined by the type of readout required for a specific application intended for the image sensor array 10.

During normal operation (i.e. image capture), the voltage Vdd supplied to the drain of the reset transistor 22 is common to every circuit 11 (i.e. pixel) in the array 10. Each row 1 to n of circuits receives a reset enable signal $RRE_1$ to $RRE_n$ respectively via a row reset line $14_1$ to $14_n$. The reset enable signals $RRE_1$ to $RRE_n$ are active when at a logical high and all have the same amplitude which may be substantially at the level of the supply voltage Vdd. Again, during normal operation, the voltage level associated with this logical high is common throughout the array. This means that all photodiodes 21 in circuits 11 in the array 10 are reset to the same level, ie the same amount of reset charge is placed on the node of the photodiode 21 for every circuit 11.

The common reset voltage Vdd ensures that each circuit 11 will respond in a similar manner if illuminated by light of a similar intensity. This is ideal for image capture operations but does not lend itself to the isolation of adjacent circuits as would be required if the array were to be tested electrically rather that optically.

In order to test the image sensor array 10 in accordance with the present invention, different reset voltages are applied to the nodes 25 of the photodiodes 21 in at least adjacent sensor circuits 11 in the array 10. A predetermined period of time after the reset voltage has been applied, the voltage at each node 25 is sensed to determine its level. The detected level for each sensor circuit 11 which has been provided with its individual signature, may then be compared to an expected signal level for that circuit to determine if the circuit is faulty. In addition, if the detected levels for adjacent sensor circuits 11 are identical or very similar, it will be an indication that they are shorted together.

With reference to FIG. 1, one way of implementing the present invention is to provide different reset voltages to adjacent columns of sensor circuits 1l1 using lines $VR_1$ to $VR_m$. Thus, referring to FIG. 2, rather then have a common voltage Vdd,,the voltage to the drain of transistor 22 in adjacent columns 1 to m would differ. In addition, the reset enable signal $RRE_1$ to $RRE_n$ would be generated at different active voltage levels for adjacent rows 1 to n of sensor circuits 11. Thus, referring to FIG. 2, the reset enable signals $RRE_1$ to $RRE_n$ applied to the gates 26 of transistors 22 in adjacent rows 1 to n would result in different voltages being applied to nodes 22 in the sensor circuits in adjacent rows 1 to n. This ensures that each sensor circuit 11 will be reset to a different voltage level than its neighbors, ie the column neighbors will be different because of different reset voltages on lines $VR_1$ to $VR_m$ and the row neighbors will be different because of the reset enable signals $RRE_1$ to $RRE_n$ on reset lines $14_1$ to $14_n$. Therefore, it may be determined if an individual sensor circuit 11 is faulty by comparing the value of the signal received from the sensor circuit 11 to an expected level. In addition, if any one or more of the column lines or row lines are open circuited, groups of sensor circuits will appear to be inoperative, analysis will determine the faulty line. On the other hand, if column lines $VR_1$ to $VR_m$ or data line $DL_1$ to $DL_m$ are shorted to ground or to one another, similar readings will be seen from a series of sensor circuits 11 in one or in adjacent rows. Finally, if row lines $14_1$ to $14_n$ or lines $15_1$ to $15_n$ are shorted to ground or to one another, similar readings will be seen from adjacent sensor circuits 11 in adjacent rows. In this manner the entire sensor array may be tested for faults by cycling through the array 10 once.

Figure 3:
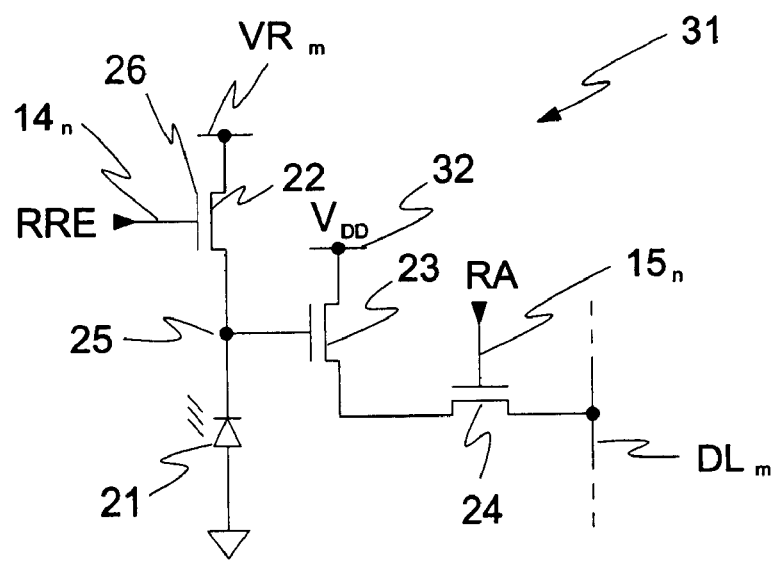
FIG. 3 is a circuit diagram of an active pixel sensor (APS) circuit in accordance with one embodiment of this invention.

It is noted that if different voltages are applied to the reset voltage lines $VR_1$ to $VR_m$ or to at least adjacent lines, similar transistors 23 in circuits 11 in adjacent columns 1 to m will also have different voltages applied to their drains causing the transistors 23 to operate at different levels. This may be avoided by laying out sensor circuits 11 of the type illustrated in FIG. 3. The circuit 31 is similar to the circuit 11 illustrated in FIG. 2 except that the drain of transistor 23 is connected to a supply voltage Vdd line 32 which is common to all of the circuits 31 in the sensor array 10.

Figure 4:
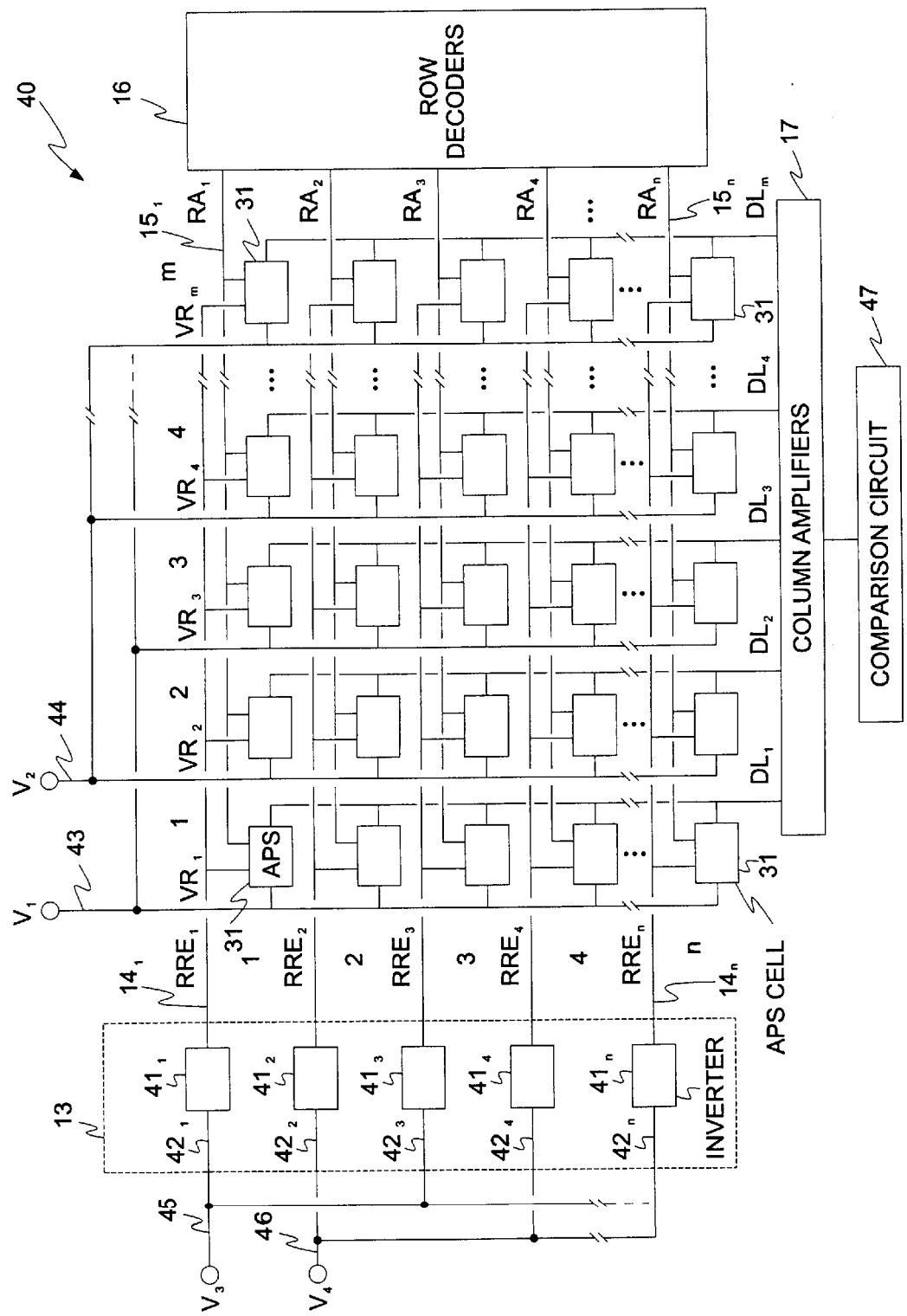
FIG. 4 is a block diagram of an image sensor array in accordance with one embodiment of this invention.

As will be described with regard to FIG. 4, there are a number of ways to implement the present invention. FIG. 4 illustrates a sensor array 40 that is similar to the array 10 in FIG. 1 wherein common elements are identified by common reference numbers. The sensor circuits 31 are identified as the type of circuit illustrated in FIG. 3 where a separate supply voltage Vdd is applied to transistors 23 via lines 32 which is integrated on the chip but is not shown on FIG. 4 for clarity. FIG. 4 further schematically illustrates the row reset control 13 which includes inverters $41_1$ to $41_n$ adapted to generate reset enable signals $RRE_1$ to $RRE_n$ on reset lines $14_1$ to $14_n$ respectively. The inverters $41_1$ to $41_n$ are connected to voltage supply lines $42_1$ to $42_n$ which determines the amplitude of the output signals $RRE_1$ to $RRE_n$. Normally, all lines $42_1$ to $42_n$ and $VR_1$ to $VR_m$ are laid out on the die and connected together to a common supply Vdd via a single bond pad.

However in the array 40 in accordance with the present invention each of the lines $42_1$ to $42_n$ and $VR_1$ to $VR_m$ may be separate so that they may be connected to different voltage supplies to carry-out the testing of the array. This would require either a separate power supply pin for each voltage level, or number voltage generators or dividers integrated on the sensor array 40 chip. Such an implementation would result in a severe die area penalty.

Figure 6:
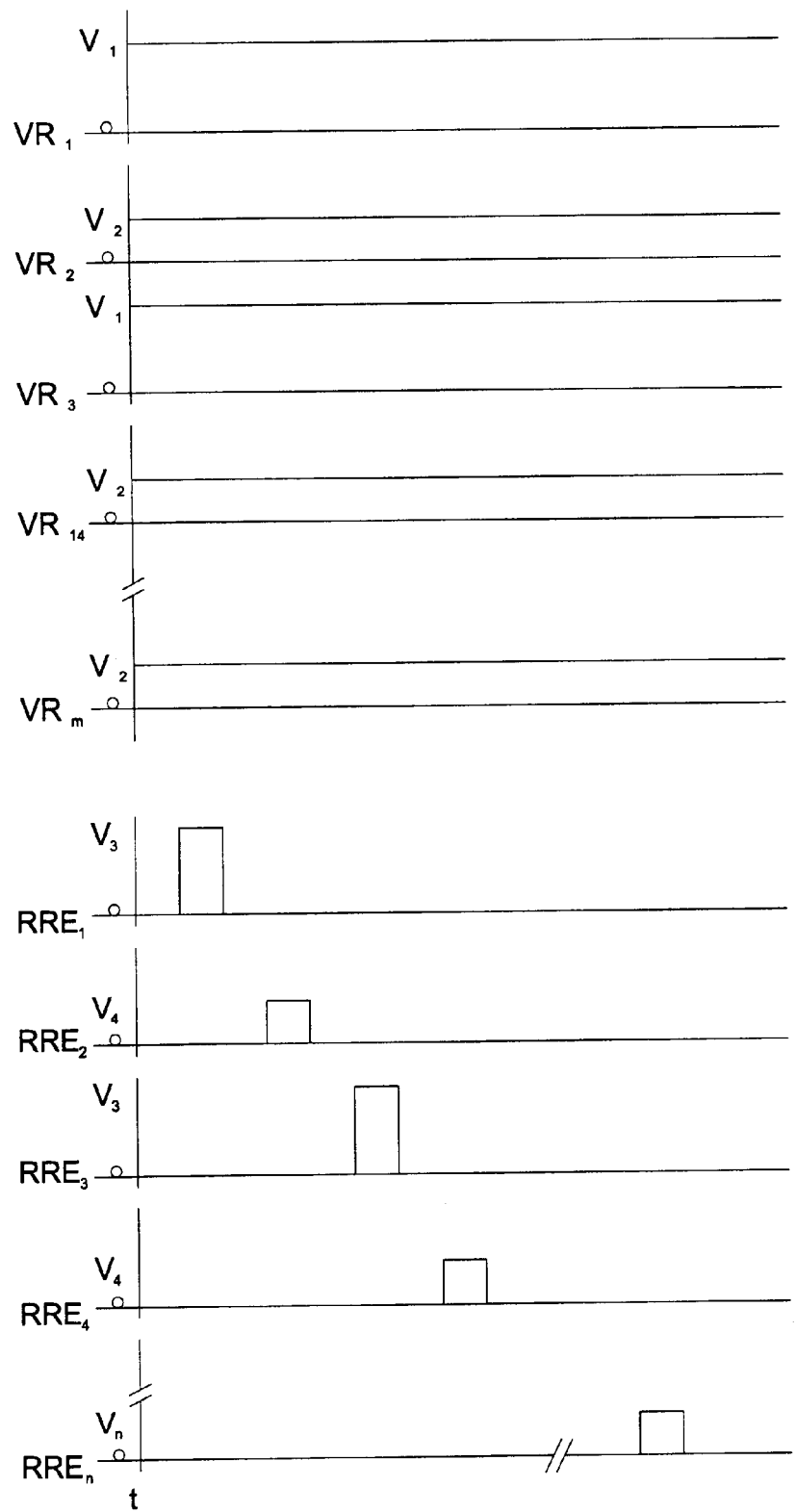
FIG. 6 is illustrates reset voltages and reset voltage enable signals used in the preferred embodiment of the present invention.

In the preferred embodiment shown in FIG. 4, two voltage levels $V_1$ and $V_2$ are applied to the column reset voltage lines $VR_1$ to $VR_m$ via lines 43 and 44 and two levels of voltage $V_3$ and $V_4$ are applied to the rows $42_1$ to $42_n$ via lines 45 and 46. These voltage signals are illustrated in FIG. 6. The embodiment may be further simplified by applying the same two voltage levels $V_1$ and $V_2$ to the column voltage reset lines $VR_1$ to $VR_m$ by connecting lines 43 and 44 respectively as well as to the rows $42_1$ to $42_n$ by connecting lines 45 and 46 respectively. Thus one level $V_1$ would be provided to the odd numbered rows $42_1$, $42_3$, . . . and columns $VR_1$, $VR_3$, . . . while the second level $V_2$ would be provided to the even numbered rows $42_2$, $42_4$, . . . and columns $VR_2$, $VR_4$, . . . Within the scope of the present invention, other combinations of voltage levels are also possible.

The two voltage levels $V_1$ and $V_2$ of the preferred embodiment can be provided by an external source through two bond pads where one pad is already connected to a regular supply voltage Vdd. Once tested, if it is concluded that the die is not defective, the pads can be shorted together for normal operation. When the die is configured as such, the array will then receive only a single supply voltage Vdd.

Figure 5:
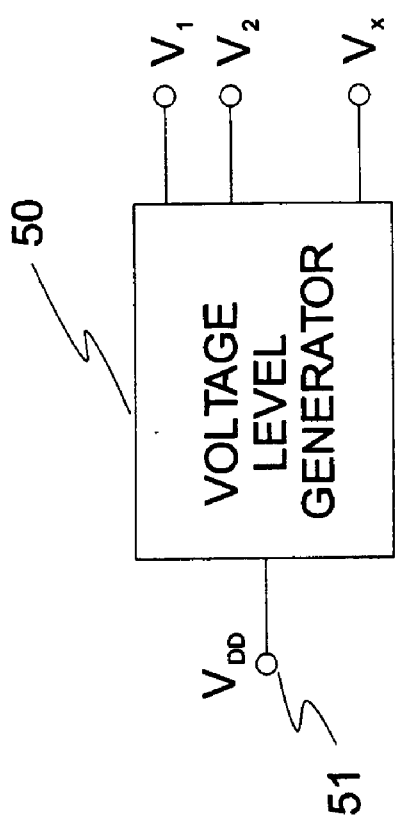
FIG. 5 is a schematic diagram of a multi-level voltage source used with the present invention.

In another embodiment of the invention as illustrated schematically in FIG. 5, a voltage level generator 50 may be integrated on the die which would include a single bond pad 51 for an external power supply Vdd. Circuits for boosting voltage levels such as charge pumps and circuits for stepping down voltage levels are well known in the art. The generator could provide any number of output voltages required for the testing of the sensor array 40.

As described above, defects are identified by comparing the signals received on data lines $DL_1$ to $DL_m$ to expected values. This comparison can be accomplished off chip by a test system; however, a comparison circuit 47 may be integrated on the chip to determine if the signals received on data lines $DL_1$ to $DL_m$ agree with the expected data. This would greatly reduce the amount of complexity required of the system used to test the die. When combined with on chip voltage generators, this circuitry could be used as part of a built in self test (BIST) function.

The main advantage of the present invention is the ease through which independent APS circuits 11, 31 are tested. A further advantage of the present invention is the minimization of peripheral circuitry necessary to distribute the differing voltages to adjacent rows and columns in the array. Yet another advantage of the current invention is the ability to test all of the row lines and data lines on an individual basis, resulting in faster interpretation of faults which reduces the time required to correct problems. These advantages are achieved together with the reduction of manufacturing testing dependency on an external calibrated light source in order to reduce the cost of such a light source or totally eliminate its requirement for a certain class or grade of imaging products.

Several design variations are possible with the described architecture. Though the present invention was described with regard to one structure of an APS circuit 11, 31 referred to as a three transistor (3T) structure, it is possible to vary this basic circuit structure and still perform the tests in accordance with the invention. Other possible APS circuits include but are not limited to 4T and 5T structures of which there are several variations.

The built in self test (BIST) embodiment in accordance with this invention lends itself to the possibility of using it for applications other than testing during manufacturing. One application could be for an image sensor used in a system which is controlled remotely, potentially in a satellite or some other location requiring such control. If the system were to malfunction, the BIST capability would allow the operator to test the sensor to determine if the fault was with components of the image sensor or some other component in the system.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. Apparatus for testing an image sensor array having sensing circuits arranged in rows and columns wherein the sensing circuits each include a photosensitive device, comprising:

means for resetting the voltage of the photosensitive device in each of the sensor circuits such that at least adjacent sensor circuits are reset to different voltage levels; and means for sensing the voltage on each of the photosensitive devices to determine if each voltage is at an expected level.

2. Image sensor array testing apparatus as claimed in claim 1 which comprises:

means for comparing the sensed voltages from the photosensitive devices to expected voltage levels to identify faulty components in the sensor array.

3. Image sensor array testing apparatus as claimed in claim 1 which comprises:

means for comparing the sensed voltages from the photosensitive devices to expected voltage levels to determine faulty sensor circuits.

4. Apparatus for testing an image sensor array having sensing circuits arranged in rows and columns comprising:

a first set of conductive lines for providing different reset voltages to adjacent columns of sensing circuits;

a second set of conductive lines for providing different voltage reset enable signals to adjacent rows of sensing circuits;

a third set of conductive lines for providing access signals to rows of sensing circuits for detecting the reset voltages on the sensing circuits; and a fourth set of lines connected to columns of sensing circuits to receive the detected reset voltages.

5. Image sensor array testing apparatus as claimed in claim 4 which comprises:

comparator means for comparing the detected reset voltages to expected voltage levels to identify faulty components in the sensor array.

6. Image sensor array testing apparatus as claimed in claim 4 which comprises:

means coupled to each of the second set of conductive lines for generating the voltage reset enable signals; and first voltage supply means coupled to each of the voltage reset enable signal generating means for supplying different voltages to generating means in adjacent rows.

7. Image sensor array testing apparatus as claimed in claim 6 which comprises:

second voltage supply means for supplying a first voltage level $V_1$ to alternate lines in the first set of conductive lines and a second voltage level $V_2$ to the remaining lines in the first set of conductive lines; and wherein:

the first voltage supply means is adapted to supply a third voltage level $V_3$ to alternate voltage reset signal generating means and a fourth voltage level $V_4$ to the remaining voltage reset signal generating means.

8. Image sensor array testing apparatus as claimed in claim 6 wherein the first voltage supply means is adapted to supply a first voltage level $V_1$ to alternate lines in the first set of conductive lines and to alternate voltage reset signal generating means, and a second voltage supply means is adapted to supply a second voltage level $V_2$ to the remaining lines in the first set of conductive lines and to the remaining voltage reset signal generating means.

9. A method of testing an image sensor array having sensor circuits arranged in rows and columns, comprising the steps of:
   a. resetting the voltage of a photosensitive device in each of the sensor circuits such that adjacent sensor circuits are reset to different voltage levels; and
   b. sensing the voltage on each of the photosensitive devices to determine if each voltage is at an expected level.

10. A method as claimed in claim 1 wherein step (a) includes:
   i. applying common reset voltages to sensor circuits in the columns such that adjacent columns receive different reset voltage amplitudes; and
   ii. applying common enable voltage signals to the sensor circuits in the rows such that adjacent rows receive different enable signal amplitudes.

11. A method as claimed in claim 9 wherein step (b) includes:
   i. sensing the voltage on the columns of sensor circuits in parallel and the rows of sensor circuits sequentially.

12. A method as claimed in claim 9 and further comprising the step of:
   c. comparing the sensed voltage from the photosensitive devices to expected values to determine faulty sensor circuits.

13. A method as claimed in claim 9 and further comprising the step of:
   c. comparing the sensed voltage from the photosensitive devices to expected values to determine faulty components in the sensor array.

14. A method of testing an image sensor array having sensor circuits arranged in rows and columns and wherein each sensor circuit includes a photosensitive device, a first switch for applying a reset voltage from a voltage reset line to the photosensitive device under the control of a reset signal, a second switch for sensing the voltage on the photosensitive device under the control of an enable signal and applying it to a data line, the method comprising the steps of:
   a. resetting the voltage on the photosensitive device in each of the sensor circuits such that the photosensitive devices in adjacent sensor circuits are reset to different voltage levels; and
   b. sensing the voltage on each of the photosensitive devices to determine if each voltage is at an expected level.

15. A method as claimed in claim 14 wherein step (a) includes:
   i. applying common reset voltages to sensor circuits in the columns such that adjacent columns receive different reset voltage amplitudes; and
   ii. applying common enable voltage signals to the sensor circuits in the rows such that adjacent rows receive different enable signal amplitudes.

16. A method as claimed in claim 14 wherein step (b) includes:
   i. sensing the voltage on the columns of sensor circuits in parallel and the rows of sensor circuits sequentially.

17. A method as claimed in claim 14 and further comprising the step of:
   c. comparing the sensed voltage from the photosensitive devices to expected values to determine faulty sensor circuits.

18. A method as claimed in claim 14 and further comprising the step of:
   c. comparing the sensed voltage from the photosensitive devices to expected values to determine faulty components in the sensor array.

\* \* \* \* \*

UNITED STATES PATENT AND TRADEMARK OFFICE
CERTIFICATE OF CORRECTION

PATENT NO. : 6,489,798 B1
DATED : December 3, 2002
INVENTOR(S) : Scott-Thomas et al.

It is certified that error appears in the above-identified patent and that said Letters Patent is hereby corrected as shown below:

Column 9,
Line 12, "1" should read -- 9 --

Signed and Sealed this

Twenty-second Day of June, 2004

JON W. DUDAS
*Acting Director of the United States Patent and Trademark Office*